United States Patent
Wagner et al.

(10) Patent No.: US 11,783,190 B2
(45) Date of Patent: Oct. 10, 2023

(54) METHOD AND DEVICE FOR ASCERTAINING AN EXPLANATION MAP

(71) Applicant: Robert Bosch GmbH, Stuttgart (DE)

(72) Inventors: Joerg Wagner, Renningen (DE); Tobias Gindele, Zürich (CH); Jan Mathias Koehler, Stuttgart (DE); Jakob Thaddaeus Wiedemer, Laichingen (DE); Leon Hetzel, Werther (DE)

(73) Assignee: ROBERT BOSCH GMBH, Stuttgart (DE)

( * ) Notice: Subject to any disclaimer, the term of this patent is extended or adjusted under 35 U.S.C. 154(b) by 403 days.

(21) Appl. No.: 17/261,810

(22) PCT Filed: Jul. 3, 2019

(86) PCT No.: PCT/EP2019/067840
§ 371 (c)(1),
(2) Date: Jan. 20, 2021

(87) PCT Pub. No.: WO2020/025244
PCT Pub. Date: Feb. 6, 2020

(65) Prior Publication Data
US 2021/0279529 A1    Sep. 9, 2021

(30) Foreign Application Priority Data
Aug. 3, 2018 (DE) .......................... 102018213052.3

(51) Int. Cl.
G06N 3/08 (2023.01)
G06N 3/084 (2023.01)
G06N 3/04 (2023.01)
G06F 18/241 (2023.01)
G06F 18/40 (2023.01)
(Continued)

(52) U.S. Cl.
CPC ........... *G06N 3/084* (2013.01); *G06F 18/241* (2023.01); *G06F 18/41* (2023.01); *G06N 3/04* (2013.01);
(Continued)

(58) Field of Classification Search
CPC ............ G06N 3/084; G06N 3/04; G06N 3/08; G06N 3/045; G06N 3/048; G06N 5/045;
(Continued)

(56) References Cited

U.S. PATENT DOCUMENTS

2018/0262291 A1* 9/2018 Doster .................... H04B 10/60
2019/0220738 A1* 7/2019 Flank ...................... G16H 50/20
(Continued)

FOREIGN PATENT DOCUMENTS

DE    102018205561 A1    2/2019

OTHER PUBLICATIONS

English Translation of the Written Opinion of the International Search Authority dated Feb. 3, 2021. (Year: 2021).*
(Continued)

*Primary Examiner* — Juan A Torres
(74) *Attorney, Agent, or Firm* — NORTON ROSE FULBRIGHT US LLP; Gerard Messina

(57) ABSTRACT

A method for ascertaining an explanation map of an image. All those pixels of the image are highlighted which are significant for a classification of the image ascertained with the aid of a deep neural network. The explanation map is being selected in such a way that it selects a smallest possible subset of the pixels of the image as relevant. The explanation map leads to the same classification result as the image when the explanation map is supplied to the deep neural network for classification. The explanation map is selected in such a way that an activation caused by the explanation map does not essentially exceed an activation
(Continued)

caused by the image in feature maps of the deep neural network.

24 Claims, 2 Drawing Sheets

(51) Int. Cl.
  *G06V 10/764* (2022.01)
  *G06V 10/82* (2022.01)
  *G06V 10/44* (2022.01)

(52) U.S. Cl.
  CPC .............. *G06N 3/08* (2013.01); *G06V 10/454* (2022.01); *G06V 10/764* (2022.01); *G06V 10/82* (2022.01); *G06V 2201/03* (2022.01)

(58) Field of Classification Search
  CPC ..... G06F 18/241; G06F 18/41; G06V 10/454; G06V 10/764; G06V 10/82; G06V 2201/03
  USPC ........................................................ 382/157
  See application file for complete search history.

(56) References Cited

U.S. PATENT DOCUMENTS

2019/0325269 A1* 10/2019 Bagherinezhad ..... G06F 18/241
2019/0377955 A1* 12/2019 Swaminathan .. H04N 21/23418
2020/0021873 A1* 1/2020 Swaminathan ...... H04N 21/466

OTHER PUBLICATIONS

International Search Report for PCT/EP2019/067840, dated Nov. 14, 2019.

Mengnan Du et al., "Towards Explanation of DNN-Based Prediction With Guided Feature Inversion," Cornell University Library, 2018, pp. 1-10. <https://arxiv.org/pdf/1804.00506.pdf> Downloaded Jan. 20, 2021.

Babiker and Goebel: "Using KL-divergence to focus Deep Visual Explanation", Interpretable ML Symposium, 31st Conference on Neural Information Processing Systems (NIPS 2017), Long Beach, CA, USA, pp. 1-5, ttps://arxiv.org/abs/1711.06431v2 [accessed on Mar. 29, 2019].

Kindermans, et al.: "Learning how to explain neural networks: PatternNet and PatternAttribution", CoRR, (2017), pp. 1-12, https://arxiv.org/abs/1705.05598v2, [accessed on Mar. 29, 2019].

Montavon, et al.: "Methods for interpreting and understanding deep neural networks", Digital Signal Processing, 73, (2018), pp. 1-15, ISSN 1051-2004, http://www.sciencedirect.com/science/article/pii/S1051200417302385.

Samek, et al.: "Tutorial on Interpreting and Explaining Deep Models in Computer Vision", (2018), pp. 1-14, . URL: http://www.heatmapping.org/slides/2018_CVP R_1.pdf [accessed on Mar. 29, 2019].

* cited by examiner

METHOD AND DEVICE FOR ASCERTAINING AN EXPLANATION MAP

FIELD

The present invention relates to a method for ascertaining an explanation map, a computer program, a single machine-readable storage medium or a plurality thereof and a single computer or a plurality thereof, a machine classification system as well as a display system.

BACKGROUND INFORMATION

A device for classifying a retina is described in German Patent Application No. DE 10 2018 205 561, which includes an artificial neural network having at least one convolution layer, the convolution layer containing a plurality of trainable convolution kernels and supplying an activation map for each convolution kernel, which assigns to discrete positions in the input of the at least one convolution layer an output value in each case, which is a measure of the local correspondence of the input with the particular convolution kernel, the at least one convolution layer being connected downstream from at least one classifier layer, which maps its input to a set of probabilities with the aid of trainable weights so that this input belongs to one of multiple predefined classes, in particular whether the tissue is healthy or pathologically altered, an evaluation unit being provided, which is designed to ascertain a relevance map of the output of the at least one convolution layer by weighted summation of the activation maps received from the at least one convolution layer with the aid of weights stored in an aggregation layer, the relevance map showing the places of the tissue which were significant for the assessment.

SUMMARY

In accordance with an example embodiment, a method in accordance with the present invention may have the advantage over the related art that an improved ascertainment of an explanation map is made possible, which permits, in particular, a pixel-precise representation. The piece of information contained in the explanation map is accessible in the first place to human perception.

Advantageous refinements of the present invention are described herein.

In accordance with an example embodiment of the present invention, in a system for supporting medical diagnostics, in which a possible diagnosis is determined with the aid of a deep neural network, based on certain features of an image, it is important to clearly show an attending physician which parts of the image resulted in this diagnosis.

In a first aspect, the present invention therefore relates to a method for ascertaining an explanation map of an image, i.e., the regions of an image which are significant for a classification result, the image being classified with the aid of a deep neural network (i.e., the image is assigned to a class made up of a predefinable plurality of classes), in which pixels, in particular all pixels, of the image are changed depending on how significant they are for the classification of the image, the explanation map selecting pixels of the image as relevant, and the explanation map leading to the same classification result as the image when it is supplied to the deep neural network for classification, the explanation map being selected in such a way that, in feature maps of the deep neural network, an activation caused by the explanation map does not then essentially exceed an activation caused by the image (i.e., when correspondingly supplied to the deep neural network).

The change of the pixels may take place, for example, in such a way that all those pixels of the image are changed which are significantly indicative of the classification of the image.

This means that it is provided that not only the image but also the explanation map is supplied to the deep neural network, the classifications received in each case as the output variable of the deep neural network not being the same.

The fact that a pixel of the image is selected as relevant may mean that an activation of this pixel in the activation map has an absolute value which is greater than a predefinable threshold value, in particular zero.

A deep neural network is usually a neural network which includes a plurality of layers.

Due to the fact that the explanation map is created in the size of the incoming image and is not created in the size of an activation map or an output variable of a (in particular the last) convolution layer, a particularly accurate representation results, since the explanation map in the alternative approaches described would have to be scaled up to the size of the incoming image. Relevant edge and color information is retained.

In one refinement of the present invention, it may be provided that the explanation map is selected in such a way that a loss function L is optimized. In other words, the provided method is based on an optimization problem including secondary conditions, i.e., for example $$s_x^* = \underset{s_x}{\mathrm{argmin}}(L); s_x^{(0)} = x; \text{where: } h^l(s_x) \leq h^l(x) \forall l; \quad (1)$$

Equation (1) may be advantageously solved with the aid of a mask b, which may be, for example, multiplicative, i.e., $s_x = x \cdot b$, $b \in [0,1]$ being optimized, advantageously with the aid of a start condition $b(0)=1$. Alternatively, mask b may also be additive, i.e., $s_x = x-b$, b being optimized with the aid of start condition $b(0)=0$. If the optimized mask is designated by $b^*$, $s_x^* = x \cdot b^*$ or $s_x^* = x+b^*$ results for the solution of the optimization problem from equation (1).

In the optimization problem, an explanation map or representation $s_x^*$; which meets certain properties is sought, based on an image x. These properties may be particularly easily and flexibly shown with the aid of the loss function.

The connection between image x and representation $s_x^*$ may then be defined by initial state $s_x^{(0)}$ of $s_x$ (or by a corresponding start condition of mask b) as well as by the secondary condition of the optimization. One possible specific embodiment is that representation $s_x^*$ contains only features which are also contained in image x. The initial state may thus be $s_x^{(0)} = x$, the secondary condition, which is to be advantageously met for each ReLU layer of the deep neural network, may be $h^l(s_x) \leq h^l(x)$, $h^l$ being the activation of the lth ReLU layer of the deep neural network (it also being possible, of course, to use other activation functions instead of a ReLU function).

The loss function advantageously includes multiple (additive) components, i.e., $L = L_h + L_w + L_c$. The additive components may, of course, be weighted differently by parameters, but these parameters may also be integrated into the definition of the components. When solving the optimization problem from equation (1), these weighted parameters may be optionally adapted. A first component $L_h = l_h(s_x)$ may be selected in such a way that it characterizes how many pixels of the image are selected as relevant. For example, this component may be constituted by L1 norm $l_h(s_x)=\|s_x\|_1$. Alternatively, this component may be used by L1 norm of multiplicative mask b for $s_x=x \cdot b$ ($b \in [0.1]$). This component would then cause all irrelevant pixels to be drawn to the mean value. Alternatively, the irrelevant pixels could be set to another arbitrary value.

Alternatively or additionally, the loss function may include a second component, which characterizes how much the classification result which occurs for the explanation map corresponds to the classification result which occurs for the image. This may be achieved by a component $L_w=l_w(f(x|\theta), f(s_x|\theta))$, f describing the deep neural network or a part of the deep neural network. Parameters of the deep neural network are designated by θ. The output of the deep neural network, i.e., the classification, is designated by $f(x|\theta)$ or $f(s_x|\theta)$.

The second component may be constituted by a Kullback-Leibler divergence, i.e., $l_w=D_{KL}(f(x|\theta)|f(s_x|\theta))$.

Alternatively, the second component may occur area by area, in particular pixel by pixel, due to a function which characterizes how much a particular pixel contributes to the classification result occurring for the image. This function may be constituted, for example, by a logit function $f_{logit}^i$ of a class i, so that the corresponding component of the loss function is then constituted by $l_w=-f_{logit}^i(s_x|\theta)$ In other words, the second component is constituted by the negative probability of class i (upon minimizing the probability of class i). Alternatively, it may be constituted by a function, which determines all pixels which activate a feature i. If $f_l^i$ designates an ith feature map of the lth layer, the associated term of the loss function may be constituted by $l_w=-\|f_l^i(s_x|\theta)\|_1$. Other norms are possible, for example an L2 norm.

The implementation of the secondary condition that the activation by the explanation map may not essentially exceed the activation by the image may be particularly easily implemented by the optimization approach using a third component $L_c$ in the loss function, which penalizes an exceeding of this type, i.e., for example $L_c=\|\text{maximum}(h^l(s_x)-h^l(x), 0)\|_1$. Other norms are possible, for example an L2 norm.

Alternatively, the meeting of this secondary condition may be achieved in that activations $h_l(s_x)$ are set to a predefinable value in the feature map during the ascertainment of the explanation map, in particular to the maximum permissible value according to the secondary condition, for example due to $h'_l(s_x)=\min(h_l(x), h_l(s_x))$. If a gradient-based optimization method is used, a corresponding gradient $\delta_l$ may then be constituted by $\delta'_l=\delta_l \cdot [h_l(s_x)<h_l(x)]$. in the backpropagation. The notation [ . . . ] means as usual that the value=1, if the condition is met, and =0, if the condition is not met.

Alternatively, the meeting of the secondary condition may be achieved in that, when using the gradient-based optimization method, gradient $\delta_l$ of the backpropagation of a feature map $h_l$ of a layer having activation functions, in particular a ReLU layer, (i.e., the gradient present at the output of the activation function) of the deep neural network is set to be equal to a predefinable gradient value, in particular set to be equal to zero, if activation $h_l(s_x)$ by explanation map $s_x$ exceeds activation $h_l(x)$ by image x in the layer, i.e., for example, $\delta'_l=\delta_l \ldots [h_l(s_x)<h_l(x)]$.

The explanation map ascertained in this manner may now be advantageously ascertained and displayed, in particular next to the image. Due to the location-accurate resolution and the selection of only the relevant pixels, it is thus possible to generate a representation which is accessible for an examination by a human expert, in particular a physician.

Specific embodiments of the present invention are explained in greater detail below, with reference to the figures.

DETAILED DESCRIPTION OF EXAMPLE EMBODIMENTS

Figure 1:
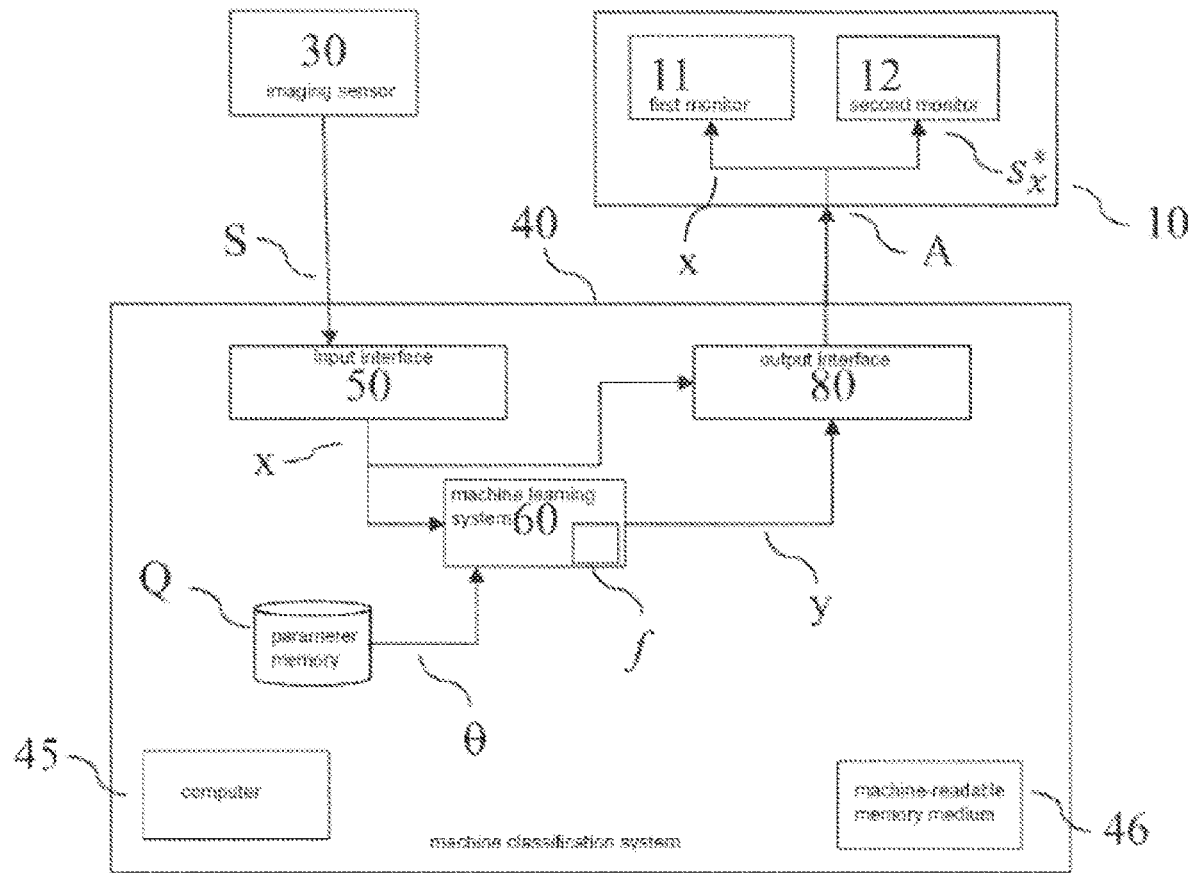
FIG. 1 schematically shows a design of specific embodiments of the present invention.

In one preferred specific embodiment of the present invention, FIG. 1 shows a machine classification system 40, which is configured to carry out the present invention. Machine classification system 40 includes a computer 45 and a machine-readable memory medium 46. It further includes a machine learning system 60, which ascertains an output signal y from an image x supplied thereto. Image x may be ascertained, for example via an optional input interface 50, from a sensor signal S, which was ascertained by an imaging sensor 30.

The machine learning system ascertains a classification $f(x|\theta)$ of image x with the aid of a deep neural network f. Deep neural network f is parameterized using parameters θ, which are stored in a parameter memory Q. Machine learning system 60 further ascertains an explanation map $s^*_x$, for example with the aid of the method illustrated in FIG. 2. Explanation map $s^*_x$ and classification $f(x|\theta)$ together form output signal y, from which an activation signal A is ascertained together with image x, for example, with the aid of an optional output interface 80. Activation signal A may include, for example explanation map $s^*_x$, classification $f(x|\theta)$ and image x. The activation signal is then supplied to a display unit 10, which includes, for example, two monitors 11, 12. Image x is supplied to first monitor 11 and displayed, and explanation map $s^*_x$ is supplied to second monitor 12 and displayed. Classification $f(x|\theta)$ may also be optionally displayed.

Figure 2:
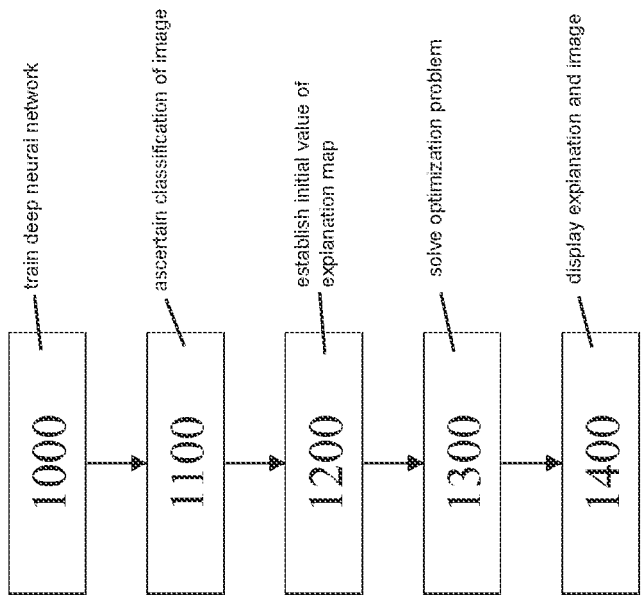
FIG. 2 shows the sequence of the method according to one aspect of the present invention in a flowchart.

FIG. 2 illustrates one specific embodiment of the method for ascertaining explanation map $s^*_x$. Deep neural network f is first (1000) trained, for example to be able to discriminate between different disease patterns in images. A classification $f(x|\theta)$ of image x is then (1100) ascertained for an image x supplied to machine learning system 60 with the aid of deep neural network f. These steps do not necessarily have to be part of the method according to the present invention but instead determine its context and may be carried out, for example, ahead of time by separate units.

An initial value $s_x^{(0)}$ of the explanation map is subsequently (1200) established, for example, $s_x^{(0)}=0$. The optimization problem defined by a formula (1) is then (1300) solved, preferably with the aid of a gradient descent method for the purpose of determining explanation map $s^*_x$.

Explanation map $s^*_x$ and image x are then (1400) supplied to monitors 11, 12 and displayed thereon as described. The display may take place side by side or also as a superposition. This ends the method.

In another specific embodiment of the present invention, imaging sensor 30 is implemented in a manufacturing plant. The method may then be used to show rejects to a human operator via the display unit, making it possible in the first place for the operator to determine whether a reject is, in fact, present via the display on display unit 10.

In a further specific embodiment of the present invention, an arbitrary image recording unit is provided instead of imaging sensor 30, which may be an imaging sensor 30 or which, for example, loads and provides images from a database. The method may then be employed to check the functional capability of deep neural network f for the purpose of enabling a human developer to analyze, via the display on display unit 10, which image regions have resulted in a possible misclassification.

In yet a further specific embodiment of the present invention, imaging sensor 30 is part of a monitoring system. The display on display unit 10 enables a human expert to determine whether a presumably abnormal scene detected by machine learning system 60 (for example, an unclaimed suitcase) is in fact present.

It is understood to those skilled in the art that computer 46 may also be constituted by a plurality of computers, and machine-readable memory system 45 may be constituted by a plurality of machine-readable memory media.

What is claimed is:

1. A method comprising:
    ascertaining an explanation map of an image indicating an extent to which different parts of an input image, which is classified by a deep neural network (a) into which the input image is input and (b) that includes a plurality of layers of neurons that are each activatable, affected the classification made by the deep neural network, wherein the input image is formed of a plurality of pixels, the ascertaining being performed by:
        identifying a subset of the plurality of pixels as being significant for the classification of the image ascertained using a deep neural network; and
        generating, as the explanation map, a modified version of the image in which the identified subset of the plurality of pixels are highlighted;
    wherein the identifying of the subset of the plurality of pixels is performed:
        in a manner by which input of the explanation map into the deep neural network results in a classification by the deep neural network that is the same as the classification, by the deep neural network, of the input image; and
        by optimizing a lost function, the optimization of the lost function ensuring no exceedance of activations of the neurons of respective ones of the plurality of layers caused by the input of the explanation map into the deep neural network over activations of the neurons of the respective layer caused by the input of the input image into the deep neural network.

2. The method as recited in claim 1, wherein the loss function includes a component, which characterizes how much the classification for the explanation map corresponds to the classification for the image.

3. The method as recited in claim 2, wherein the component is constituted by a Kullback-Leibler divergence.

4. The method as recited in claim 2, wherein the component occurs pixel by pixel, due to a function which characterizes how much a particular pixel contributes to the classification result which occurs for the explanation map.

5. The method as recited in claim 2, wherein the ensuring is effected a by another component in the loss function, which penalizes an exceeding of the activation.

6. The method as recited in claim 5, wherein the loss function includes a third component, which characterizes how many pixels of the image are included in the subset.

7. The method as recited in claim 2, wherein the loss function includes another first component, which characterizes how many pixels of the image are included in the subset.

8. The method as recited in claim 1, wherein an activation in a feature map, during the generating of the modified version of the image as the explanation map, to a maximum value achievable without the exceedance.

9. The method as recited in claim 1, wherein the ensuring is achieved by using a gradient-based optimization in which, for a respective one of the layers, a gradient of a backpropagation of a feature map of the respective layer of the deep neural network is set equal to a predefined gradient zero when the activation by the explanation map exceeds the activation by the image in the respective layer.

10. The method as recited in claim 1, further comprising: displaying the explanation map.

11. The method as recited in claim 10, further comprising: displaying the image next to the explanation map.

12. The method as recited in claim 1, wherein:
    the lost function is optimized by executing an optimization of $$s_x^* = \underset{s_x}{\mathrm{argmin}}(L),$$

under a condition that $h^l(s_x) \leq h^l(s) \forall l$;
    L is the loss function;
    $S_x$ is the explanation map;
    $s^*_x$ is a respective one of a plurality of states of the explanation map, with $s_x^{(0)}$ being an initial one of the plurality of states of the explanation map and equaling x, which represents the input image; and
    $h^l$ is the activation of the neurons of the $l^{th}$ layer of the deep neural network.

13. The method as recited in claim 12, wherein the optimization is performed by modifying the explanation map in each of a plurality of iterations of the optimization using a respective version of a mask b*.

14. The method as recited in claim 13, wherein the modifying, in each of the iterations, is performed by multiplying a latest state of the explanation map by the mask.

15. The method as recited in claim 14, wherein the mask $\in [0,1]$ and is optimized.

16. The method as recited in claim 13, wherein the modifying, in each of the iterations, is performed by adding the mask to a latest state of the explanation map.

17. The method as recited in claim 16, wherein the mask is optimized with a starting condition in which the mask is set to zero.

18. The method as recited in claim 13, wherein:
    the modifying, in each of the iterations, is performed by either adding the mask to, or multiplying the mask with, a latest state of the explanation map;
    the loss function L has a first component $L_h$ given by an L1 norm: $l_h(s_x) = \|s_x\|_1$;
    the loss function L has a second component $L_w$ selected in such a way that the explanation map $s_x^*$ leads to the same classification as when the image is supplied to the deep neural network for the classification;
    the ensuring is performed:
        in a manner that, during the identifying, sets the activation of the respective $l^{th}$ layer for the explanation map to a maximum value achievable without the exceedance of the activations of the neurons of the respective layer caused by the input of the explanation map into the deep neural network over the activations of the neurons of the respective layer caused by the input of the input image into the deep neural network; or in a manner that uses a gradient-based optimization method in which a gradient of a backpropagation of the activation for the explanation map of a layer 1 of the deep neural network is set equal to a predefined gradient if the activation for the explanation map at the respective level exceeds the activation for the image as the respective layer; or by the loss function L having a third component $L_c$ that penalizes the exceedance in each of the iterations.

19. The method as recited in claim 18, wherein the ensuring is performed in the manner that uses the gradient-based optimization method, and the predefined gradient is equal to zero.

20. The method as recited in claim 1, wherein the loss function includes a component, which characterizes how many pixels of the image are included in the subset.

21. The method as recited in claim 1, wherein the optimization of the lost function is performed to optimize minimization of a number of the plurality of pixels that are included in the subset.

22. A non-transitory machine-readable memory medium on which is stored a computer program that is executable by a computer and that, when executed by the computer, causes the computer to perform a method for ascertaining an explanation map of an image indicating an extent to which different parts of an input image, which is classified by a deep neural network (a) into which the input image is input and (b) that includes a plurality of layers of neurons that are each activatable, affected the classification made by the deep neural network, wherein the input image is formed of a plurality of pixels, the method comprising:

identifying a subset of the plurality of pixels as being significant for the classification of the image ascertained using a deep neural network; and generating, as the explanation map, a modified version of the image in which the identified subset of the plurality of pixels are highlighted;

wherein the identifying of the subset of the plurality of pixels is performed:

in a manner by which input of the explanation map into the deep neural network results in a classification by the deep neural network that is the same as the classification, by the deep neural network, of the input image; and by optimizing a lost function, the optimization of the lost function ensuring no exceedance of activations of the neurons of respective ones of the plurality of layers caused by the input of the explanation map into the deep neural network over activations of the neurons of the respective layer caused by the input of the input image into the deep neural network.

23. A system comprising:

a computer processor, wherein the computer processor is configured to ascertain an explanation map of an image indicating an extent to which different parts of an input image, which is classified by a deep neural network (a) into which the input image is input and (b) that includes a plurality of layers of neurons that are each activatable, affected the classification made by the deep neural network, wherein the input image is formed of a plurality of pixels, the ascertainment being performed by:

identifying a subset of the plurality of pixels as being of the image which are significant for the classification of the image ascertained using a deep neural network; and generating, as the explanation map, a modified version of the image in which the identified subset of the plurality of pixels are highlighted;

wherein the identifying of the subset of the plurality of pixels is performed:

in a manner by which input of the explanation map into the deep neural network results in a classification by the deep neural network that is the same as the classification, by the deep neural network, of the input image; and by optimizing a lost function, the optimization of the lost function ensuring no exceedance of activations of the neurons of respective ones of the plurality of layers caused by the input of the explanation map into the deep neural network over activations of the neurons of the respective layer caused by the input of the input image into the deep neural network.

24. The system as recited in claim 23 further comprising a display, wherein the computer processor is configured to display the explanation map on the display.

* * * * *